(12) United States Patent
Babrowicz et al.

(10) Patent No.: US 12,043,013 B2
(45) Date of Patent: Jul. 23, 2024

(54) MULTILAYER FILM WITH HIGH OXYGEN TRANSMISSION

(71) Applicant: Cryovac, LLC, Charlotte, NC (US)

(72) Inventors: Robert Babrowicz, Tega Cay, SC (US);
Dylan Z. Hopkins, Charlotte, NC (US);
Tyler Hoffman, Spartanburg, SC (US);
Darren Brice Mungo, Greer, SC (US)

(73) Assignee: Cryovac, LLC, Charlotte, NC (US)

( * ) Notice: Subject to any disclaimer, the term of this patent is extended or adjusted under 35 U.S.C. 154(b) by 431 days.

(21) Appl. No.: 17/441,718

(22) PCT Filed: Mar. 25, 2020

(86) PCT No.: PCT/US2020/024573
§ 371 (c)(1),
(2) Date: Sep. 22, 2021

(87) PCT Pub. No.: WO2020/198282
PCT Pub. Date: Oct. 1, 2020

(65) Prior Publication Data
US 2022/0194063 A1  Jun. 23, 2022

Related U.S. Application Data

(60) Provisional application No. 62/823,716, filed on Mar. 26, 2019.

(51) Int. Cl.
| | | |
|---|---|---|
| *B32B 27/08* | (2006.01) | |
| *B32B 27/30* | (2006.01) | |
| *B32B 27/32* | (2006.01) | |
| *B32B 27/36* | (2006.01) | |
| *C08L 23/08* | (2006.01) | |
| *C08L 25/10* | (2006.01) | |

(52) U.S. Cl.
CPC ............ *B32B 27/08* (2013.01); *B32B 27/302* (2013.01); *B32B 27/306* (2013.01); *B32B 27/32* (2013.01); *B32B 27/36* (2013.01); *C08L 23/0815* (2013.01); *C08L 23/0853* (2013.01); *C08L 25/10* (2013.01); *B32B 2250/03* (2013.01); *B32B 2270/00* (2013.01); *B32B 2307/54* (2013.01); *B32B 2307/546* (2013.01); *B32B 2307/558* (2013.01); *B32B 2307/58* (2013.01); *B32B 2307/582* (2013.01); *B32B 2307/72* (2013.01); *B32B 2307/7244* (2013.01); *B32B 2307/732* (2013.01); *B32B 2435/02* (2013.01); *B32B 2439/70* (2013.01); *C08L 2203/16* (2013.01)

(58) Field of Classification Search
None
See application file for complete search history.

(56) References Cited

U.S. PATENT DOCUMENTS

| | | | |
|---|---|---|---|
| 3,835,618 A | | 9/1974 | Perdue |
| 5,332,616 A | | 7/1994 | Patrick et al. |
| 5,846,582 A | * | 12/1998 | Mayfield .............. B65D 75/305 |
| | | | 426/106 |
| 5,849,127 A | | 12/1998 | Kuo |
| 6,042,913 A | | 3/2000 | Miranda et al. |
| 7,338,708 B2 | | 3/2008 | Wilburn et al. |
| 7,422,796 B2 | | 9/2008 | Chen |
| 2003/0198715 A1 | | 10/2003 | Morris et al. |
| 2010/0055275 A1 | | 3/2010 | Chen |
| 2017/0283567 A1 | | 10/2017 | Bilgen et al. |
| 2018/0001604 A1 | | 1/2018 | Van Loon et al. |
| 2019/0283383 A1 | | 9/2019 | Ginosatis |

FOREIGN PATENT DOCUMENTS

| | | |
|---|---|---|
| AU | 726242 B2 | 11/2000 |
| EP | 3539768 | 5/2021 |
| JP | 2006027722 A | 2/2006 |

\* cited by examiner

*Primary Examiner* — Sheeba Ahmed
(74) *Attorney, Agent, or Firm* — Jason R. Womer (57) ABSTRACT

A multilayer film having a heat seal layer and a high oxygen transmission layer. The high oxygen transmission layer being made from a blend of a heterogeneous ethylene/alpha-olefin copolymer; and at least one of: ethylene acrylate copolymer; homogeneous ethylene/alpha-olefin copolymer; ethylene acrylic acid; ethylene/vinyl acetate copolymer; and styrene butadiene block copolymer. The multilayer film having an oxygen transmission rate of at least 8,000 cc (STP)/m2/day/1 atm at 23 C at 0% RH measured according to ASTM 3985.

20 Claims, 4 Drawing Sheets

MULTILAYER FILM WITH HIGH OXYGEN TRANSMISSION

BACKGROUND

The subject matter disclosed herein relates to the field of films, particularly flexible packaging films, more particularly to films suited for the packaging of products which benefit from being packaged in a film exhibiting a high oxygen transmission rate.

In the packaging of food products, such as fresh seafood (non-frozen), if the packaging material does not have a relatively high oxygen transmission rate ("OTR"), under certain conditions the result can be the growth of *Clostridium botulinum*, which can produce illness for a consumer of the seafood. The United States Food and Drug Administration sets a standard for the packaging of seafood because of the risk of growth of *Clostridium botulinum*. Under the standard, for fresh seafood that is packaged in a reduced oxygen package (e.g. vacuum packages, MAP where oxygen levels are lower than atmospheric levels, etc.), the packaging film must have an oxygen (i.e., O2) transmission rate of at least 10,000 cc at standard temperature and pressure (STP)/m2/day/1 atm at 23 C at 0% RH (relative humidity) measured according to ASTM 3985.

Films exhibiting a relatively high oxygen transmission rate tend to be more difficult to consistently run in machines and to achieve a reliable cut. Films having a high oxygen transmission generally result in more film breaks during manufacturing, incomplete cuts and other processing issues.

The packaging of food products, including meats, cheeses and seafood in a film having the desired oxygen transmission rate is rendered problematic by the opposing requirements of a film having high OTR, good machinability and cuttability. Food products include cheese, beef, birds such as poultry (including chicken, duck, goose, turkey, and the like), buffalo, camel, crustacean (including shellfish, clams, scallops, mussels, oysters, lobster, crayfish, crab, shrimp, prawns, and the like), fish (including salmon, trout, eel, cod, herring, plaice, whiting, halibut, turbot, ling, squid, tuna, sardines, swordfish, dogfish, shark, and the like), game (including deer, eland, antelope, and the like), game birds (such as pigeon, quail, doves, and the like), goat, hare, horse, kangaroo, lamb, marine mammals (including whales and the like), amphibians (including frogs and the like), monkey, pig, rabbit, reptiles (including turtles, snakes, alligators, and the like), and/or sheep.

It would be desirable to provide a film exhibiting a combination of high oxygen transmission for the packaging of food products while at the same time improving machinability and cuttability of the film.

The discussion above is merely provided for general background information and is not intended to be used as an aid in determining the scope of the claimed subject matter.

BRIEF DESCRIPTION

A multilayer film having a heat seal layer and a high oxygen transmission layer. The high oxygen transmission layer being made from a blend of a heterogeneous ethylene/alpha-olefin copolymer; and at least one of: ethylene acrylate copolymer; homogeneous ethylene/alpha-olefin copolymer; ethylene acrylic acid; ethylene/vinyl acetate copolymer; styrene butadiene block copolymer. The multilayer film having an oxygen transmission rate of at least 8,000 cc (STP)/m2/day/1 atm at 23 C at 0% RH measured according to ASTM 3985.

An advantage that may be realized in the practice of some disclosed embodiments of the multilayer film is having a high OTR with good physical properties such as machinability, cuttability and abuse resistance.

In one exemplary embodiment, a multilayer film is disclosed. The multilayer film comprises a first layer which is a first outer film layer which serves as a heat seal layer, the first layer, the first layer having a thickness of from 1 to 20 percent of a total thickness of the multilayer film, at least one second layer which serves as a high oxygen transmission layer, the at least one second layer comprising a blend of: 5 to 35 wt % of a heterogeneous ethylene/alpha-olefin copolymer having a density of at least 0.89 g/cc; and 65 to 95 wt % of at least one member selected from the group consisting of: ethylene acrylate copolymer; homogeneous ethylene/alpha-olefin copolymer having a density of from 0.86 to 0.91 g/cc; ethylene acrylic acid; ethylene/vinyl acetate copolymer having a vinyl acetate monomer content of from 10 to 30 mole percent; and styrene butadiene block copolymer. The at least one second layer having a thickness of from 60 to 98 percent of the total thickness of the multilayer film; the total thickness of the multilayer film being at least 1.5 mils, and the film having an oxygen transmission rate of at least 8,000 cc (STP)/m2/day/1 atm at 23 C at 0% RH measured according to ASTM 3985.

In another exemplary embodiment, the multilayer film further comprises a third layer which is a second outer film layer which serves as a skin layer, the third layer having a thickness of from 1 to 20 percent of a total thickness of the multilayer film.

In another exemplary embodiment, the multilayer film is not perforated.

In another exemplary embodiment, the first layer comprises a first polymer selected from the group consisting of homogeneous ethylene/alpha-olefin copolymer, heterogeneous ethylene/alpha-olefin copolymer, high density polyethylene, low density polyethylene, linear low density polyethylene, ionomer resin, ethylene/unsaturated ester copolymer and ethylene/unsaturated acid copolymer.

In another exemplary embodiment, the first polymer is a linear low density polyethylene.

In another exemplary embodiment, the third layer comprises a second polymer selected from the group consisting of homogeneous ethylene/alpha-olefin copolymer, heterogeneous ethylene/alpha-olefin copolymer, high density polyethylene, low density polyethylene, ionomer resin, ethylene/unsaturated ester copolymer and ethylene/unsaturated acid copolymer.

In another exemplary embodiment, the second polymer is a high density polyethylene.

In another exemplary embodiment, the heterogeneous ethylene/alpha-olefin copolymer is an ethylene/octene copolymer having a monomer content of between 10-12 wt %.

In another exemplary embodiment, heterogeneous ethylene/alpha-olefin copolymer comprises 10-30 wt % of the second layer.

In another exemplary embodiment, the multilayer film has a tensile strength at break in either the longitudinal or traverse direction of at least 6000 psi as measured in accordance with ASTM D882.

In another exemplary embodiment, the multilayer film has a tensile strength at break in either the longitudinal or traverse direction of at least 6500 psi as measured in accordance with ASTM D882.

In another exemplary embodiment, the multilayer film has an elongation at break in either the longitudinal or traverse direction of less than 700% as measured in accordance with ASTM D882.

In another exemplary embodiment, the multilayer film has a Young's modulus in either the longitudinal or traverse direction of at least 5000 psi as measured in accordance with ASTM D882.

In another exemplary embodiment, the multilayer film has a Young's modulus in either the longitudinal or traverse direction of at least 5500 psi as measured in accordance with ASTM D882.

In another exemplary embodiment, the multilayer film has a Young's modulus in either the longitudinal or traverse direction of at least 6000 psi as measured in accordance with ASTM D882.

In another exemplary embodiment, the multilayer film has a tear propagation-max load in the longitudinal direction of at least 80 grams as measured in accordance with ASTM D1938.

In another exemplary embodiment, the multilayer film has a tear propagation-max load in the longitudinal direction of at least 100 grams as measured in accordance with ASTM D1938.

In another exemplary embodiment, the multilayer film has a tear propagation-max load in the transverse direction of at least 110 grams as measured in accordance with ASTM D1938.

In another exemplary embodiment, the multilayer film has a tear propagation-max load in the transverse direction of at least 120 grams as measured in accordance with ASTM D1938.

In another exemplary embodiment, the at least one second layer makes up from 90 to 95 percent of the total film thickness, with the first and third layers together making up from 5 to 10 percent of the total film thickness.

In another exemplary embodiment, the at least one second layer comprises a plurality of layer.

In another exemplary embodiment, the at least one second layer comprises at least four layers having the same composition.

In another exemplary embodiment, the multilayer film has total film thickness of from 1.5 to 4.0 mils.

In another exemplary embodiment, the multilayer film has total film thickness of from 2.0 to 3.5 mils.

In another exemplary embodiment, the multilayer film has a total free shrink at 185° F. of from 50 to 115 percent.

In another exemplary embodiment, the multilayer film has an $O_2$-transmission rate of from 10,000 to 15,000 cc (STP)/m2/day/1 atm at 23 C at 0% RH measured according to ASTM 3985.

In another exemplary embodiment, at least one layer of the multilayer film comprises a polymer network which has been crosslinked.

In another exemplary embodiment, every layer of the multilayer film comprises a polymer network which has been crosslinked by irradiation.

In another exemplary embodiment, the heterogeneous ethylene/alpha-olefin copolymer is a heterogeneous linear ethylene/alpha-olefin copolymer.

In another exemplary embodiment, the heterogeneous ethylene/alpha-olefin copolymer has a density of from 0.89 to 0.91 g/cc, a melt index less than 0.7 g/10 min.

In another exemplary embodiment, the multilayer film has a total free shrink at 185° F. is less than 10%.

In another exemplary embodiment, the multilayer film has an impact strength peak force of at least 22 Joules as measured in accordance with ASTM D3763.

In another exemplary embodiment, multilayer film has an impact strength peak force of at least 25 Joules as measured in accordance with ASTM D3763.

In another exemplary embodiment, multilayer film has an impact strength peak force of at least 30 Joules as measured in accordance with ASTM D3763.

In another exemplary embodiment, the multilayer film has an oxygen transmission rate of at least 9,000 cc (STP)/m2/day/1 atm at 23 C at 0% RH measured according to ASTM 3985.

In another exemplary embodiment, the multilayer film has an oxygen transmission rate of at least 10,000 cc (STP)/m2/day/1 atm at 23 C at 0% RH measured according to ASTM 3985.

In another exemplary embodiment, the ethylene/acrylate copolymer is selected from the group consisting of ethylene/methyl acrylate copolymer, ethylene/ethyl acrylate copolymer and ethylene/butyl acrylate copolymer.

In another exemplary embodiment, the ethylene/acrylate copolymer is ethylene/methyl acrylate copolymer having a methyl acrylate monomer content of from 20 to 24 mole percent.

In another exemplary embodiment, the heterogeneous ethylene/alpha-olefin copolymer has a density of from 0.89 to 0.94 g/cc.

In another exemplary embodiment, the heterogeneous ethylene/alpha-olefin copolymer has a density of from 0.89 to 0.92 g/cc.

In another exemplary embodiment, the heterogeneous ethylene/alpha-olefin copolymer has a melt index less than 2.0 g/10 min.

In another exemplary embodiment, the heterogeneous ethylene/alpha-olefin copolymer has a melt index less than 0.7 g/10 min.

In another exemplary embodiment, the first and third layers each have a thickness that is less than 10% of the total thickness of the multilayer film.

In another exemplary embodiment, the first and third layers each have a thickness that is less than 5% of the total thickness of the multilayer film.

In another exemplary embodiment, the first and third layers each have a thickness that is less than 3% of the total thickness of the multilayer film.

In another exemplary embodiment, the multilayer film is formed into a bag.

In another exemplary embodiment, a packaged product is disclosed. The packaged product includes a food product; and a package surrounding the product. The package surrounding the product, the package comprising a multilayer film comprising: a first layer which is a first outer film layer which serves as a heat seal layer, the first layer, the first layer having a thickness of from 1 to 20 percent of a total thickness of the multilayer film; at least one second layer which serves as a high oxygen transmission layer, the at least one second layer comprising a blend of: 5 to 35 wt % of a heterogeneous ethylene/alphaolefin copolymer having a density of at least 0.89; and 65 to 95 wt % of at least one member selected from the group consisting of: ethylene acrylate copolymer; homogeneous ethylene/alpha-olefin copolymer having a density of from 0.86 to 0.91 g/cc; ethylene acrylic acid; ethylene/vinyl acetate copolymer having a vinyl acetate monomer content of from 10 to 30 mole percent; and styrene butadiene block copolymer; and the at least one second layer having a thickness of from 60 to 98 percent of the total thickness of the multilayer film; the total thickness of the multilayer film being at least 1.5 mils, and the film having an oxygen transmission rate of at least 8,000 cc (STP)/m2/day/1 atm at 23 C at 0% RH measured according to ASTM 3985.

In another exemplary embodiment, the food product is a fresh seafood product.

In another exemplary embodiment, the multilayer film has an oxygen transmission rate of at least 10,000 cc (STP)/m2/day/1 atm at 23 C at 0% RH measured according to ASTM 3985.

In another exemplary embodiment, a skin package is disclosed. The skin package includes a food product; a top web over the product, the top web having a multilayer film comprising: a first layer which is a first outer film layer which serves as a heat seal layer, the first layer, the first layer having a thickness of from 1 to 20 percent of a total thickness of the multilayer film; at least one second layer which serves as a high oxygen transmission layer, the at least one second layer comprising a blend of: 5 to 35 wt % of a heterogeneous ethylene/alpha-olefin copolymer having a density of at least 0.89; and 65 to 95 wt % of at least one member selected from the group consisting of: ethylene acrylate copolymer; homogeneous ethylene/alpha-olefin copolymer having a density of from 0.86 to 0.91 g/cc; ethylene acrylic acid; ethylene/vinyl acetate copolymer having a vinyl acetate monomer content of from 10 to 30 mole percent; and styrene butadiene block copolymer; and the at least one second layer having a thickness of from 60 to 98 percent of the total thickness of the multilayer film; the total thickness of the multilayer film being at least 1.5 mils, and the film having an oxygen transmission rate of at least 8,000 cc (STP)/m2/day/1 atm at 23 C at 0% RH measured according to ASTM 3985; and a substrate to which the multilayer film is adhered.

In another exemplary embodiment, the food product is a seafood product.

In another exemplary embodiment, the substrate is a backing board.

In another exemplary embodiment, the substrate is a thermoformed tray.

In another exemplary embodiment, the skin package is a vacuum skin package.

In another exemplary embodiment, the multilayer film of the skin package has been irradiated to a level of from 150 to 250 kGy, and the multilayer film has a total thickness of from about 2.5 to 4 mils.

In another exemplary embodiment, the multilayer film of the skin package has an oxygen transmission rate of at least 10,000 cc (STP)/m2/day/1 atm at 23 C at 0% RH measured according to ASTM 3985.

This brief description is intended only to provide a brief overview of subject matter disclosed herein according to one or more illustrative embodiments and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Thus, for further understanding of the invention, reference can be made to the following detailed description, read in connection with the drawings in which.

DETAILED DESCRIPTION

As used herein, the term "film" is used in a generic sense to include plastic web, regardless of whether it is roll film, bag or sheet. Multilayer films as disclosed herein may have a total a thickness of 5 mils or less. As used herein, the term "package" refers to packaging materials configured around an article being packaged. The phrase "packaged product," as used herein, refers to the combination of the article which is surrounded by the package.

As used herein, the term "seal" refers to any seal of a first portion (i.e., region) of a film surface to a second portion of a film surface, wherein the seal is formed by heating the portions to at least their respective seal initiation temperatures. The sealing can be performed in any one or more of a wide variety of manners, such as using a heated bar, hot air, hot wire, infrared radiation, ultrasonic sealing, radio frequency sealing, impulse sealing, seal bar, seal dome, etc.

As used herein, the phrase "heterogeneous polymer" refers to polymerization reaction products of relatively wide variation in molecular weight and relatively wide variation in composition distribution, i.e., typical polymers prepared, for example, using conventional Ziegler-Natta catalysts. Heterogeneous copolymers typically contain a relatively wide variety of chain lengths and comonomer percentages. Heterogeneous copolymers have a molecular weight distribution (Mw/Mn) of greater than 3.0.

As used herein, the phrase "homogeneous polymer" refers to polymerization reaction products of relatively narrow molecular weight distribution and relatively narrow composition distribution. Homogeneous polymers are useful in various layers of the multilayer heat-shrinkable film. Homogeneous polymers are structurally different from heterogeneous polymers, in that homogeneous polymers exhibit a relatively even sequencing of comonomers within a chain, a mirroring of sequence distribution in all chains, and a similarity of length of all chains, i.e., a narrower molecular weight distribution. Furthermore, homogeneous polymers are typically prepared using metallocene, or other single-site type catalysis, rather than using Ziegler Natta catalysts. Homogeneous polymers have a molecular weight distribution (Mw/Mn) of less than 3.0 More particularly, homogeneous ethylene/alpha-olefin copolymers may be characterized by one or more methods known to those of skill in the art, such as molecular weight distribution ($M_w/M_n$), composition distribution breadth index (CDBI), narrow melting point range, and single melt point behavior. The molecular weight distribution ($M_w/M_n$), also known as "polydispersity," may be determined by gel permeation chromatography. In some embodiments, the homogeneous ethylene/alpha-olefin copolymers have an $M_w/M_n$ of less than 2.7; in another embodiment from about 1.9 to 2.5; and it yet another embodiment, from about 1.9 to 2.3. The composition distribution breadth index (CDBI) of such homogeneous ethylene/alpha-olefin copolymers will generally be greater than about 70 percent. The CDBI is defined as the weight percent of the copolymer molecules having a comonomer content within 50 percent (i.e., plus or minus 50%) of the median total molar comonomer content. The CDBI of linear polyethylene, which does not contain a comonomer, is defined to be 100%. The Composition Distribution Breadth Index (CDBI) is determined via the technique of Temperature Rising Elution Fractionation (TREF). CDBI determination clearly distinguishes homogeneous copolymers (i.e., narrow composition distribution as assessed by CDBI values generally above 70%) from VLDPEs available commercially which generally have a broad composition distribution as assessed by CDBI values generally less than 55%. TREF data and calculations therefrom for determination of CDBI of a copolymer is readily calculated from data obtained from techniques known in the art, such as, for example, temperature rising elution fractionation as described, for example, in Wild et. al., *J. Poly. Sci. Poly. Phys. Ed.*, Vol. 20, p. 441 (1982). In some embodiments, homogeneous ethylene/alpha-olefin copolymers have a CDBI greater than about 70%, i.e., a CDBI of from about 70% to 99%. In general, homogeneous ethylene/alpha-olefin copolymers useful in the present invention also exhibit a relatively narrow melting point range, in comparison with "heterogeneous copolymers", i.e., polymers having a CDBI of less than 55%. In an embodiment, the homogeneous ethylene/alpha-olefin copolymers exhibit an essentially singular melting point characteristic, with a peak melting point ($T_m$), as determined by Differential Scanning Colorimetry (DSC), of from about 60° C. to 105° C. In an embodiment, the homogeneous copolymer has a DSC peak $T_m$ of from about 80° C. to 100° C. As used herein, the phrase "essentially single melting point" means that at least about 80%, by weight, of the material corresponds to a single $T_m$ peak at a temperature within the range of from about 60° C. to 105° C., and essentially no substantial fraction of the material has a peak melting point in excess of about 115° C., as determined by DSC analysis. DSC measurements are made on a Perkin Elmer System 7 Thermal Analysis System. Melting information reported are second melting data, i.e., the sample is heated at a programmed rate of 10° C./min to a temperature below its critical range. The sample is then reheated (2nd melting) at a programmed rate of 10° C./min.

A homogeneous ethylene/alpha-olefin copolymer can, in general, be prepared by the copolymerization of ethylene and any one or more alpha-olefin. In certain embodiments, the alpha-olefin is a $C_3$-$C_{20}$ alpha-monoolefin, a $C_4$-$C_{12}$ alpha-monoolefin, a $C_4$-$C_8$ alpha-monoolefin. In an embodiment, the alpha-olefin copolymer comprises at least one member selected from the group consisting of butene-1, hexene-1, and octene-1, i.e., 1-butene, 1-hexene, and 1-octene, respectively. In an embodiment, the alpha-olefin copolymer comprises octene-1, and/or a blend of hexene-1 and butene-1. In another embodiment, the alpha-olefin copolymer comprises a blend of at least two of octene-1, hexene-1 and butene-1.

As used herein, the term "copolymer" refers to polymers formed by the polymerization of reaction of at least two different monomers. For example, the term "copolymer" includes the co-polymerization reaction product of ethylene and an -olefin, such as 1-octene. The term "copolymer" is also inclusive of, for example, the co-polymerization of a mixture of ethylene, propylene, 1-propene, 1-butene, 1-hexene, and 1-octene. As used herein, a copolymer identified in terms of a plurality of monomers, e.g., "propylene/ethylene copolymer," refers to a copolymer in which either a monomer may copolymerize in a higher weight or molar percent than the other monomer or monomers. However, the first listed monomer generally polymerizes in a higher weight percent than the second listed monomer.

As used herein, the phrase "ethylene/alpha-olefin copolymer" refers to such heterogeneous materials as linear low density polyethylene (LLDPE), linear medium density polyethylene (LMDPE) and very low and ultra low density polyethylene (VLDPE and ULDPE); and homogeneous polymers such as metallocene catalyzed polymers. These materials generally include copolymers of ethylene with one or more comonomers selected from C4 to C10 alpha-olefins such as butene-1, hexene-1, octane-1, etc. in which the molecules of the copolymers comprise long chains with relatively few side chain branches or cross-linked structures. This molecular structure is to be contrasted with conventional low or medium density polyethylenes which are more highly branched than their respective counterparts. Other ethylene/alpha-olefin copolymers, such as the long chain branched homogeneous ethylene/alpha-olefin copolymers, are another type of ethylene/alpha-olefin copolymer.

"High density polyethylene" (HDPE) as used herein has a density of at least 0.950 grams per cubic centimeter.

"Medium density polyethylene" (MDPE) as used herein has a density in the range of from 0.930 to 0.950 grams per cubic centimeter.

"Low density polyethylene" (LDPE) as used herein has a density in the range of from 0.910 to 0.930 grams per cubic centimeter.

"Linear low density polyethylene" (LLDPE) as used herein has a density in the range of from 0.910 to 0.930 grams per cubic centimeter.

"Very low density polyethylene" VLDPE) as used herein has a density less than 0.915 grams per cubic centimeter.

As used herein, the term "oxygen transmission rate" refers to the oxygen transmitted through a film in accordance with ASTM D3985 "Standard Test Method for Oxygen Gas Transmission Rate Through Plastic Film and Sheeting Using a Coulometric Sensor," which is hereby incorporated, in its entirety, by reference thereto.

As used herein, the term "density" refers to the density of a solid measured in accordance with ASTM D792 "Standard Test Methods for Density and Specific Gravity (Relative Density) of Plastics by Displacement," which is hereby incorporated, in its entirety, by reference thereto.

As used herein, the term "melt index" refers to the uniformity of the flow rate of a polymer measured in accordance with ASTM D1238 "Standard Test Method for Melt Flow Rates of Thermoplastics by Extrusion Plastometer," which is hereby incorporated, in its entirety, by reference thereto.

As used herein, the terms "tensile strength," elongation at break," and "Youngs modulus" refer to tensile properties measured in accordance with ASTM D882 "Standard Test Method for Tensile Properties of Thin Plastic Sheeting," which is hereby incorporated, in its entirety, by reference thereto.

As used herein, the term "tear propagation" refers to the tear propagation resistance of a film measured in accordance with ASTM D1938 "Standard Test Method for Tear-Propagation Resistance (Trouser Tear) of Plastic Film and Thin Sheeting by a Single-Tear Method," which is hereby incorporated, in its entirety, by reference thereto.

As used herein, the term "impact strength" refers to the puncture properties of a film measured in accordance with ASTM D3763 "Standard Test Method for High Speed Puncture Properties of Plastics Using Load and Displacement Sensors," which is hereby incorporated, in its entirety, by reference thereto.

As used herein, the term "polyolefin" refers to any polymerized olefin, which can be linear, branched, cyclic, aliphatic, substituted, or unsubstituted. More specifically, included in the term polyolefin are homopolymers of olefin, copolymers of olefin, copolymers of an olefin and an non-olefinic comonomer copolymerizable with the olefin, such as unsaturated ester, unsaturated acid (especially alpha-beta monocarboxylic acids), unsaturated acid anhydride, unsaturated acid metal neutralized salts, and the like. Specific examples include polyethylene homopolymer, polypropylene homopolymer, polybutene, ethylene/alpha-olefin copolymer, propylene/alpha-olefin copolymer, butene/alpha-olefin copolymer, ethylene/vinyl acetate copolymer, ethylene/ethyl acrylate copolymer, ethylene/butyl acrylate copolymer, ethylene/methyl acrylate copolymer, ethylene/acrylic acid copolymer, ethylene/methacrylic acid copolymer, modified polyolefin resin, ionomer resin, polymethylpentene, etc. Modified polyolefin resin is inclusive of modified polymer prepared by copolymerizing the homopolymer of the olefin or copolymer thereof with an unsaturated carboxylic acid, e.g., maleic acid, fumaric acid or the like, or a derivative thereof such as the anhydride, ester or metal salt or the like. It could also be obtained by incorporating into the olefin homopolymer or copolymer, an unsaturated carboxylic acid, e.g., maleic acid, fumaric acid or the like, or a derivative thereof such as the anhydride, ester or metal salt or the like.

As used herein, the phrase "modified polymer," as well as more specific phrases such as "modified ethylene vinyl acetate copolymer," and "modified polyolefin" refer to such polymers having an anhydride functionality, as defined immediately above, grafted thereon and/or copolymerized therewith and/or blended therewith. Preferably, such modified polymers have the anhydride functionality grafted on or polymerized therewith, as opposed to merely blended therewith.

In general, the ethylene/alpha-olefin copolymer comprises a copolymer resulting from the copolymerization of from about 80 to 99 weight percent ethylene and from 1 to 20 weight percent alpha-olefin. Preferably, the ethylene alpha-olefin copolymer comprises a copolymer resulting from the copolymerization of from about 85 to 95 weight percent ethylene and from 5 to 15 weight percent alpha-olefin.

As used herein, the phrases "inner layer" and "internal layer" refer to any layer, of a multilayer film, having both of its principal surfaces directly adhered to another layer of the film.

As used herein, the phrase "outer layer" refers to any film layer of film having less than two of its principal surfaces directly adhered to another layer of the film. All multilayer films have two, and only two, outer layers, each of which has a principal surface adhered to only one other layer of the multilayer film. In monolayer films, there is only one layer, which, of course, is an outer layer in that neither of its two principal surfaces are adhered to another layer of the film. "Outer layer" also is used with reference to the outermost layer of a plurality of concentrically arranged layers of a seamless tubing, or the outermost layer of a seamed film tubing.

As used herein, the phrase "directly adhered," as applied to film layers, is defined as adhesion of the subject film layer to the object film layer, without a tie layer, adhesive, or other layer therebetween. In contrast, as used herein, the word "between," as applied to a film layer expressed as being between two other specified layers, includes both direct adherence of the subject layer between to the two other layers it is between, as well as including a lack of direct adherence to either or both of the two other layers the subject layer is between, i.e., one or more additional layers can be imposed between the subject layer and one or more of the layers the subject layer is between.

As used herein, the term "core," and the phrase "core layer," as applied to multilayer films, refer to any inner film layer which has a primary function other than serving as an adhesive or compatibilizer for adhering two layers to one another. Usually, the core layer or layers provide the multilayer film with a desired level of strength, i.e., modulus, and/or optics, and/or added abuse-resistance, and/or specific impermeability and/or oxygen transmission.

As used herein, the phrases "seal layer," "sealing layer," "heat seal layer," and "sealant layer," refer to an outer film layer, or layers, involved in the sealing of the film to itself, another film layer of the same or another film, and/or another article which is not a film, such as a tray or substrate. It should also be recognized that in general, up to the outer 0.01-0.50 mils of a film can be involved in the sealing of the film to itself or another layer. With respect to packages having only fin-type seals, as opposed to lap-type seals, the phrase "sealant layer" generally refers to the inside film layer of a package, as well as supporting layers within 3 mils of the inside surface of the sealant layer, the heat seal layer frequently also serving as a food contact layer in the packaging of foods. In general, sealant layers employed in the packaging art have included thermoplastic polymers, such as polyolefin, polyamide, polyester, and polyvinyl chloride.

In an embodiment, the heat seal layer comprises a polymer having a melting point of from 30° C. to 150° C., in another embodiment from 60° C. to 125° C., and in yet another embodiment from 70° C. to 120° C. In one embodiment, the linear low density ethylene/alphaolefin copolymer is a polymer for use in the heat seal layer. In an embodiment, the heat seal layer has a thickness of between 0.01-0.50 mils. In an embodiment, the heat seal layer has a thickness of between 0.05-0.10 mils. In an embodiment, the heat seal layer has a thickness of between 0.05-0.10 mils. In an embodiment, the heat seal layer has a thickness of less than 0.01 mils. In an embodiment, one or more polymers in the seal layer has a melt index of from 0.1 to 100 g/10 min, in another embodiment from 0.1 to 50 g/10 min, and in yet another embodiment from 1.0 to 40 g/10 min. In an embodiment, the seal layer has a thickness of from 0.01 to 0.20 mil, in another embodiment from 0.02 to 0.15 mil, and in yet another embodiment from 0.03 to 0.1 mil.

As used herein, the phrase "tie layer" refers to any inner film layer having the primary purpose of adhering two layers to one another. Tie layers can comprise any polymer having a polar group thereon, or any other polymer which provides sufficient interlayer adhesion to adjacent layers comprising otherwise non-adhering, or weak adhering polymers. Tie layers include, but are not limited to anhydride modified (i.e., anhydride grafted) linear low density polyethylene, and anhydride modified high density polyethylene, and ethylene propylene copolymer.

As used herein, the term "extrusion" is used with reference to the process of forming continuous shapes by forcing a molten plastic material through a die, followed by cooling or chemical hardening. Immediately prior to extrusion through the die, the relatively high-viscosity polymeric material is fed into a rotating screw of variable pitch, i.e., an extruder, which forces the polymeric material through the die.

As used herein, the term "coextrusion" refers to the process by which the outputs of two or more extruders are brought smoothly together in a feed block, to form a multilayer stream that is fed to a die to produce a layered extrudate. Coextrusion can be employed in film blowing, sheet and flat film extrusion, blow molding, and extrusion coating.

As used herein, the phrase "skin layer" refers to a film layer having only one of its surfaces directly adhered to another layer of the film and its other surface is exposed to the environment. The primary function of the skin layer is to provide puncture, abuse and abrasion resistance.

As used herein, the phrase "high oxygen transmission layer" refers to an inner film layer, or layers, that make up the majority of a multilayer film. The high oxygen transmission layer(s) include, but are not limited to ethylene acrylate copolymers; homogeneous ethylene/alpha-olefin copolymers; ethylene acrylic acids and salts thereof; ethylene/vinyl acetate copolymers; and styrene butadiene block copolymers.

As used herein, the phrase "machine direction" refers to a direction along the length of the film, i.e., in the direction of the film as the film is formed during extrusion and/or coating. As used herein, the phrase "transverse direction" refers to a direction across the film, perpendicular to the machine or longitudinal direction.

As used herein, the phrase "free shrink" refers to the percent dimensional change in a 10 cm×10 cm specimen of film, when shrunk at 185° F., with the quantitative determination being carried out according to ASTM D2732 "Standard Test Method for Unrestrained Linear Thermal Shrinkage of Plastic Film and Sheeting." Unless otherwise indicated, all free shrink values disclosed herein are, of course, "total" free shrink values, which represent a sum of (a) the percent free shrink in the longitudinal (i.e., "machine") direction dimension and (b) the percent free shrink in transverse direction.

As used herein, the term "oriented" refers to a thermoplastic web which forms a film structure in which the web has been elongated in either one direction ("uniaxial") or two directions ("biaxial") at elevated temperatures followed by being set in the elongated configuration by cooling the material while substantially retaining the elongated dimensions. This combination of elongation at elevated temperatures followed by cooling causes an alignment of the polymer chains to a more parallel configuration, thereby modifying the mechanical properties of the polymer web. Upon subsequently heating of certain unrestrained, unannealed, oriented sheet of polymer to its orientation temperature, heat shrinkage may be produced.

As used herein, the term "cross-linked" refers to a thermoplastic film having at least 50% gel content. As used herein, the term "gel content" refers to the content of gel material in a thermoplastic film formed because of cross-linking within the polymeric material. Gel content is expressed as a relative percent (by weight) of the polymer which—having formed insoluble carbon-carbon bonds between polymer chains due to cross-linking—is in a gel form. Gel content may be determined by ASTM D2765 "Standard Test Methods for Determination of Gel Content and Swell Ratio of Crosslinked Ethylene Plastics," which is incorporated herein by reference in its entirety or by the method described in the present experimental section.

All references to (and incorporations by reference of) ASTM protocols are to the most-recently published ASTM procedure as of the priority (i.e., original) filing date of this patent application in the United States Patent Office.

The multilayer film disclosed herein has at least two layers, and in an embodiment from 2 to 12 layers, in another embodiment 2 to 8 layers, in another embodiment from 3 to 6 layers, in another embodiment from 2 to 4 layers, and in another embodiment, 3 layers. Several 3-layer film structures are disclosed herein. It is understood that the second layer may be multiple layers, including micro layers. Microlayer extrusion is a technique for increasing the total number of layers in a multilayer film for a given film thickness, by reducing the thickness of the component layers of the film. Thus, creating multi layers of a film to replace a single layer while maintaining a similar thickness. In this manner, micro-layered films may have more than 5 layers, e.g., 10, 20, 30, 40, 50, or more layers.

The multilayer film disclosed herein can have a total thickness of between 1.5-4 mils, so long as the film provides the desired properties for the particular packaging operation in which the film is used. In an embodiment, the film has a total thickness (i.e., a combined thickness of all layers), of from about 1.5 to 5 mils (1 mil is 0.001 inch); in another embodiment, from about 1.7 to 4 mils; in another embodiment, from 2.0 to 3.5 mils, and in another embodiment, from 2.4 to 3.0 mils.

Figure 1:
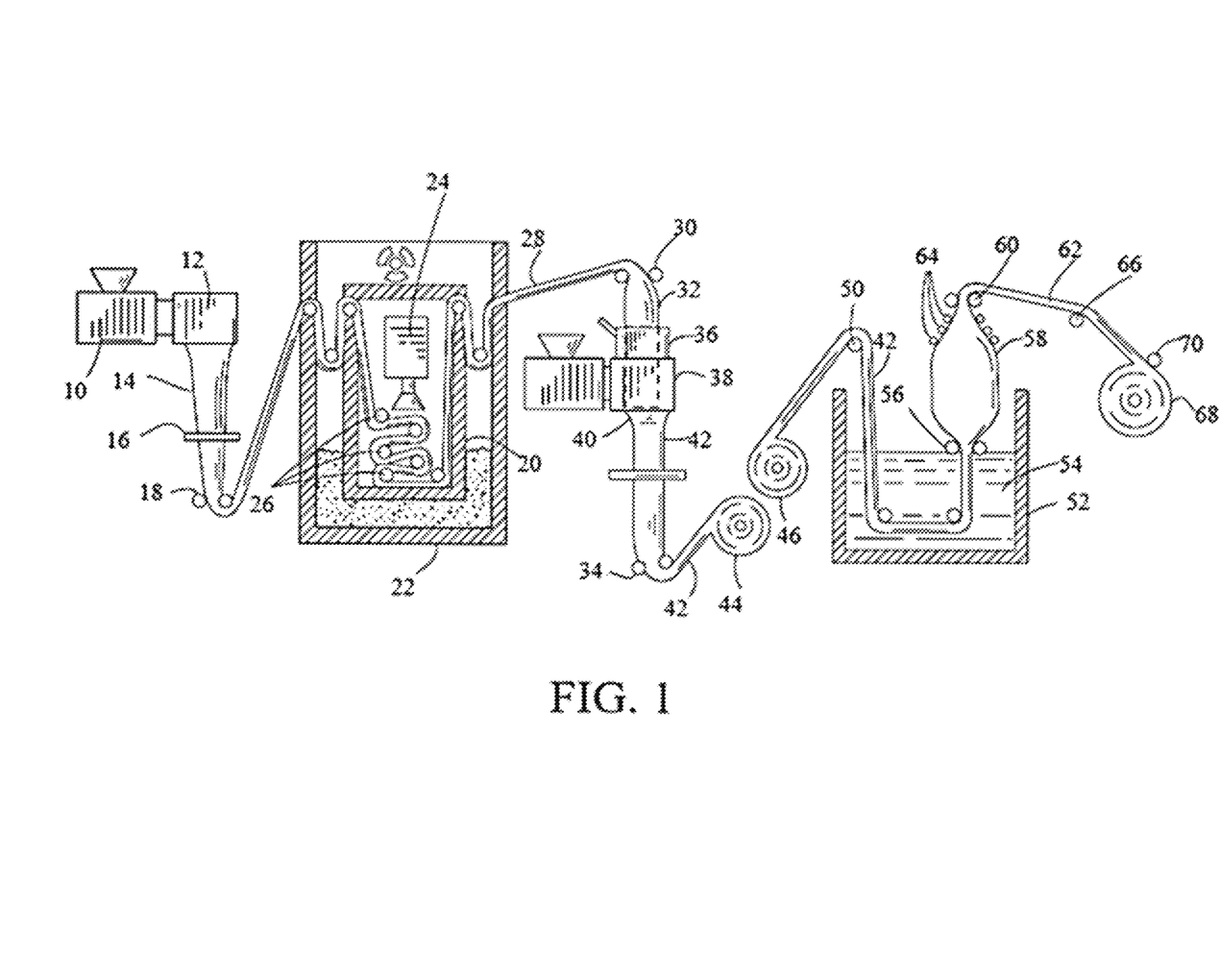
FIG. 1 is a schematic of a process for making a heat-shrinkable film in accordance with an embodiment.

FIG. 1 illustrates a schematic of a preferred process for producing a heat-shrinkable multilayer film in accordance with the present invention. In the process illustrated in FIG. 1, solid polymer beads (not illustrated) are fed to a plurality of extruders 10 (for simplicity, only one extruder is illustrated). Inside extruders 10, the polymer beads are forwarded, melted, and degassed, following which the resulting bubble-free melt is forwarded into die head 12, and extruded through an annular die, resulting in tubing 14 which is 8 to 16 mils thick, more preferably 10 to 14 mils thick.

After cooling or quenching by water spray from cooling ring 16, tubing 14 is collapsed by pinch rolls 18, and is thereafter fed through irradiation vault 20 surrounded by shielding 22, where tubing 14 is irradiated with high energy electrons (i.e., ionizing radiation) from iron core transformer accelerator 24. Tubing 14 is guided through irradiation vault 20 on rolls 26. Preferably, tubing 14 is irradiated to a level of about 60 to 70 kiloGrays (kGy).

After irradiation, irradiated tubing 28 is directed through nip rolls 30, following which tubing 28 is slightly inflated, resulting in slightly inflated tubing 32 which contains a trapped bubble of air. However, slightly inflated tubing 32 is not significantly drawn longitudinally, as the surface speed of nip rolls 34 are about the same speed as nip rolls 30. Furthermore, slightly inflated tubing 32 is inflated only enough to provide a substantially circular tubing without significant transverse orientation, i.e., without stretching.

The slightly inflated, irradiated tubing 36 is passed through vacuum chamber 36, and thereafter forwarded through coating die 38. Second tubular film 40 is melt extruded from coating die 38 and coated onto slightly inflated, irradiated tube 32, to form multi-ply tubular film 42.

After irradiation and coating, multi-ply tubing film 42 is wound up onto windup roll 44. Thereafter, windup roll 44 is removed and installed as unwind roll 46, on a second stage in the process of making the tubing film as ultimately desired. Multi-ply tubular film 42, from unwind roll 46, is unwound and passed over guide roll 50, after which multi-ply tubular film 42 passes into hot water bath tank 52 containing hot water 54. The now collapsed, irradiated, coated tubular film 42 is submersed in hot water 54 (having a temperature of about 200° F.) for a retention time of at least about 5 seconds, i.e., for a time period in order to bring the film up to the desired temperature for biaxial orientation. Thereafter, irradiated tubular film 42 is directed through nip rolls 56, and bubble 58 is blown, thereby transversely stretching tubular film 42. Furthermore, while being blown, i.e., transversely stretched, nip rolls 60 draw tubular film 42 in the longitudinal direction, as nip rolls 60 have a surface speed higher than the surface speed of nip rolls 56. As a result of the transverse stretching and longitudinal drawing, partially-irradiated, coated, biaxially-oriented blown tubing film 62 is produced, this blown tubing having been both stretched in a ratio of from about 1:1.5-1:6, and drawn in a ratio of from about 1:1.5-1:6. In an embodiment, the stretching and drawing are each performed a ratio of from about 1:2-1:4. The result is a biaxial orientation of from about 1:2.25-1:36, in an embodiment, 1:4-1:16. While bubble 58 is maintained between pinch rolls 56 and 60, blown tubing film 62 is collapsed by rolls 64, and thereafter conveyed through nip rolls 60 and across guide roll 66, and then rolled onto wind-up roll 68. Idler roll 70 assures a good wind-up.

Figure 2:
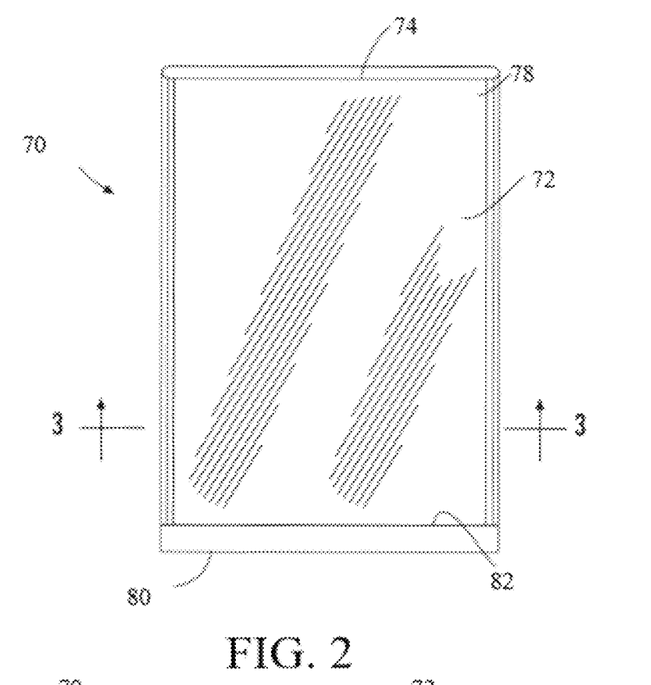
FIG. 2 is a schematic of an end-seal bag.
Figure 3:
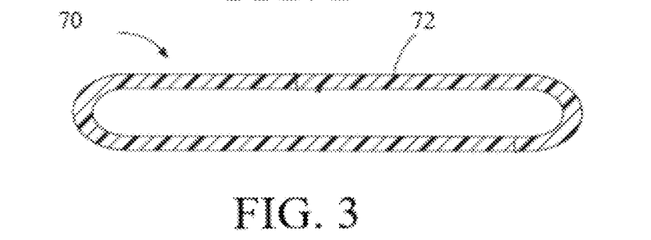
FIG. 3 is a transverse cross-sectional view taken through section 3-3 of FIG. 2.

FIG. 2 is a schematic of an end seal bag 70, in a lay-flat position, this bag being in accord with the present invention. FIG. 3 is a cross-sectional view of bag 70 taken through section 3-3 of FIG. 2. Viewing FIGS. 2 and 3 together, bag 70 comprises seamless tubular bag film 72, with top edge 74 defining an open top, first folded (i.e., seamless) bag side edge 76, second folded (i.e., seamless) bag side edge 78, bottom edge 80, and transverse end seal 82 in which the heat seal layer of the film is sealed to itself to close the bottom of the bag.

Figure 4:
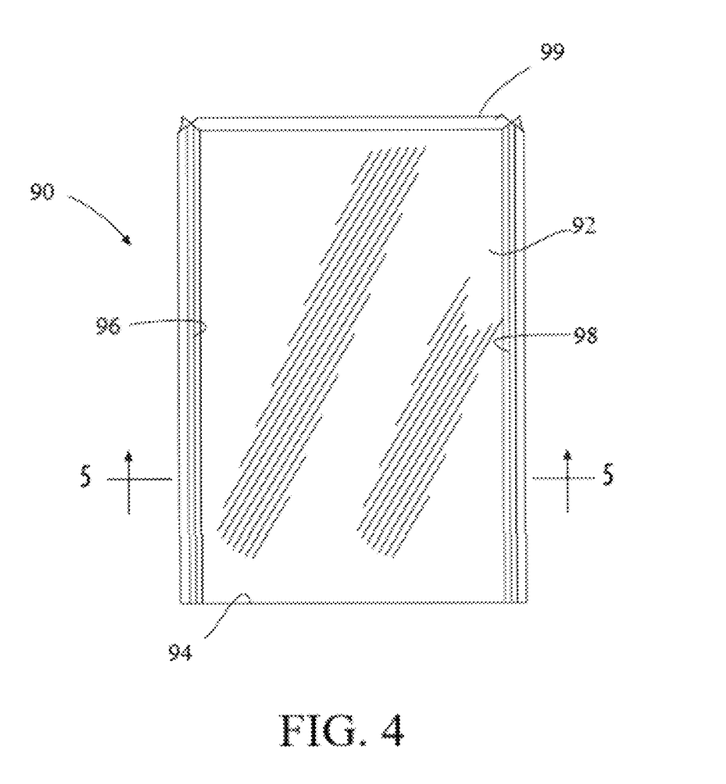
FIG. 4 is a schematic of a side-seal bag.
Figure 5:
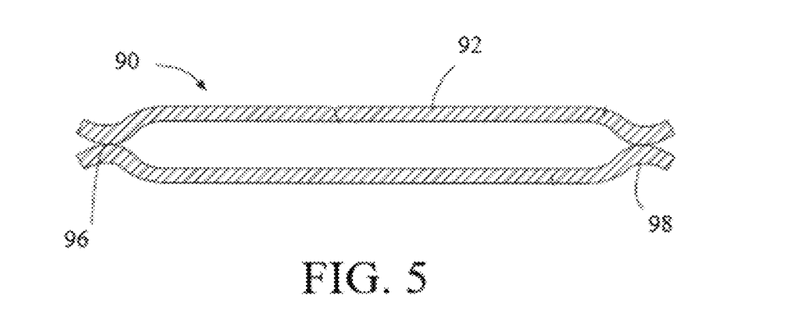
FIG. 5 is a transverse cross-sectional view taken through section 5-5 of FIG. 4.
Figure 6:
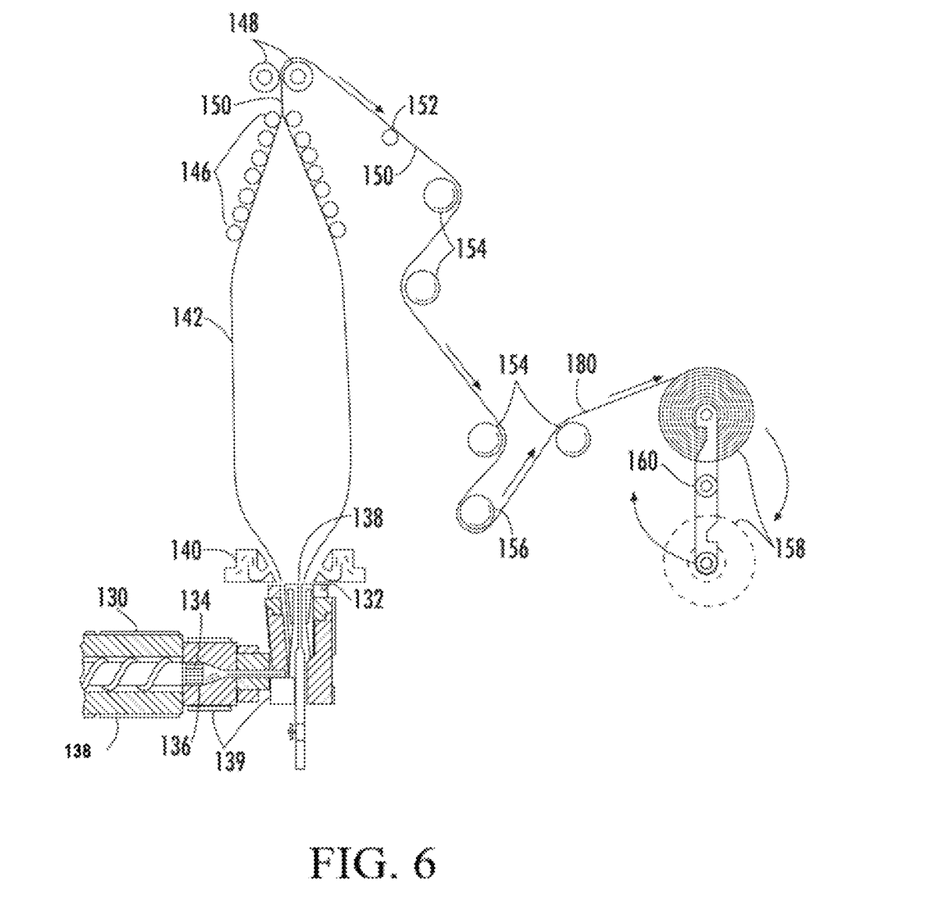
FIG. 6 is a schematic of a process for making a non-heat-shrinkable film in accordance with an embodiment.

FIGS. 4 and 5 illustrate side-seal bag 90, with FIG. 5 illustrating a schematic of side seal bag 90 in lay-flat position, and FIG. 6 illustrating a transverse cross-section through section 5-5 of FIG. 4. With reference to FIGS. 4 and 5 together, side seal bag 90 is comprised of bag film 92, folded (i.e., seamless) bottom edge 94, first side seal 96, and second side seal 98, and with top edge 99 defining the open top of the bag.

FIG. 6 illustrates a schematic view of a process for producing a non-heat-shrinkable, hot-blown multilayer film. This film is called "hot-blown" because the polymer is oriented in the bubble immediately downstream of the die head, while the polymer is hot, i.e., above, at, or near its melting point, at which time molecular orientation can occur while the polymer chains remain relaxed (versus orientation at or near the softening point, as used in heat-shrinkable film process of FIG. 1).

Although for the sake of simplicity only one extruder 130 is illustrated in FIG. 6, in some embodiments at least 2 extruders, and in some embodiments, at least three extruders. That the extruder, or extruders, supply molten polymer to coextrusion die 132 for the formation of, for example, outer layers of a film, and at least one additional extruder (not illustrated) supplied molten polymer to coextrusion die 132 for the formation of, for example, the core layer of a film. Each of the extruders is supplied with polymer pellets (not shown) suitable for the formation of the respective layer it is extruding. The extruders subject the polymer pellets to sufficient pressure and heat to melt the polymer and thereby prepare it for extrusion through a die.

Taking extruder 130 as an example, each of the extruders is preferably equipped with a screen pack 134, a breaker plate 136, and a plurality of heaters 139. Each of the coextruded film layers is extruded between mandrel 138 and die 132, and the extrudate is cooled by cool air flowing from air ring 140. The resulting blown bubble is thereafter guided into a collapsed configuration by nip rolls 148, via guide rolls 146. Collapsed film tubing 150 (in lay-flat configuration) is optionally passed over treater bar 152, and is thereafter passed over idler rolls 154, and around dancer roll 156 which imparts tension control to collapsed tube 180, after which collapsed film tubing is wound into roll 158 via winding mechanism 160.

The non-heat-shrinkable film made in accordance with the process of FIG. 6 has a total free shrink (i.e., longitudinal+transverse) at 185° F., of less than 10 percent. This film is especially suitable for use as a top web film for vacuum skin packaging. For example, after positioning a food product on support a film is positioned over the food product and support while a partial vacuum is drawn between the film and the support. Thereby causing the film to be closely formed to both the food product and the support. The film is then heat sealed to the support to enclose the food product. in accordance with, for example, U.S. Pat. No. 3,835,618, to Richard Perdue, entitled "Apparatus for Producing Vacuum Skin Package in Multiples", and U.S. Pat. No. 6,042,913, to Miranda et al, entitled "Vacuum Skin Package and Composite Film Therefor", both of which are hereby incorporated, in their entireties, by reference thereto. The vacuum skin package ("VSP") process is useful for the packaging of food products such as meat, cheese and fresh seafood, and can benefit from a relatively thick film exhibiting an OTR of at least 8,000 cc (STP)/m2/day/1 atm at 23 C at 0% RH measured according to ASTM 3985 without perforating the film. In an embodiment, the VSP process is useful for the packaging of food products such as meat, cheese and fresh seafood, and can benefit from a relatively thick film exhibiting an OTR of at least 9,000 cc (STP)/m2/day/1 atm at 23 C at 0% RH measured according to ASTM 3985 without perforating the film. In an embodiment, the VSP process is useful for the packaging of food products such as meat, cheese and fresh seafood, and can benefit from a relatively thick film exhibiting an OTR of at least 10,000 cc (STP)/m2/day/1 atm at 23 C at 0% RH measured according to ASTM 3985 without perforating the film.

In a typical skin packaging process, a sheet of thermoplastic film is placed in a frame positioned over a vacuum plate upon which a substrate (such as a backing board or tray) has been placed. The product to be skin packaged is positioned on top of the substrate and heat is applied to the thermoplastic film in the frame. When the film has been heated to become sufficiently soft, the frame is lowered and the plastic sheet drapes itself over the product. As this happens, a partial vacuum is created through the vacuum plate and the air underneath the plastic film is withdrawn through the substrate. The air pressure differential between the top and the bottom of the plastic sheet causes the sheet to be tightly pressed around the product. In an embodiment, the substrate remains level and the upper portions, lower portions, or both close around the substrate.

The film may be coated with an adhesive or the backing board may be so coated. Where the two contact each other, a strong bond is formed resulting in a package in which the product is tightly held to the backing board for safe shipping and for subsequent rack display in retail stores.

Vacuum skin packaging differs from the above described skin packaging process in that both the thermoplastic film and the substrate (such as a backing board or tray) are impervious to gases and the resulting package can be evacuated and hermetically sealed, if desired. The same end result is sought, i.e., the product is to be tightly held by the transparent film to the substrate. The conventional method employs a substrate which is porous or which is perforated so that the vacuum may be drawn directly through the substrate. Vacuum skin packaging processes generally employ a vacuum chamber with an open top. The product on an impervious substrate is placed on a platform within the vacuum chamber. The top of the chamber is then covered by a sheet of film which is clamped tightly against the chamber to form a vacuum type closure. The chamber is evacuated while the film is heated to forming and softening temperatures. The platform can then be raised to drive the product into the softened film and air pressure can be used above the film to force it tightly around the product. A primary seal is made around the perimeter of the substrate on a sealing bar or dome by pressing a heated seal bar or dome directly onto the film. Secondary seals are made solely by heating the films against a hot dome and using vacuum pressure differential to force the heated film onto the substrate.

In an embodiment, the seal bar or dome operates at a temperature ranges from 150° C. to 230° C. In another embodiment, the seal bar or dome operates at a temperature range from 190° C. to 220° C.

In one embodiment a VSP package is made by clamping a film with tooling. The film is draw up against a hot VSP dome or on to multiple individual seal heads in a preformed tray machine tool. The seal heads may be flat or dome shaped. Dome shapes may be greater than 10 mm. In another embodiment, the dome shapes are greater than 25 mm. The film is heated and then either draped over a product or blow down on the product with the pressure difference between the top of the VSP film and below the VSP film and inside the bottom tool or above the bottom film.

In another embodiment a VSP package is made by process of loading a product in a tray. The product loaded tray is loaded into a vacuum chamber and film is positioned above the product and tray. The vacuum chamber evacuates air from above the film to bring it into contact with a heating plate to heat the film. Evacuating air from within the tray through either at least one hole or from below the film. Introducing air from above the film pushes the film into contact with the product. The film is then welded to the inner surface of the tray closing any holes.

The various polymeric materials used in the examples below, as well as in examples of various comparative films, are set forth below in Table I.

TABLE I

Identity of Resins Used in Examples

| Generic Code Name | Generic Name | Vendor | Trade Name | Density | Melt Index | Comonomer Content (%) |
|---|---|---|---|---|---|---|
| $LDPE_1$ | LDPE | Qenos | LD0220MS | 0.922 | 2.6 | 0 |
| $LLDPE_1$ | LLDPE | Westlake Chemical | CV77528 | 0.910 | 2.0 | Unknown |
| $LLDPE_2$ | LLDPE | Dow | Elite AT6410 | 0.912 | Unknown | Unknown |
| $mPE_1$ | Branched metallocene PE | Dow | Affinity ® EG8100 | 0.870 | 1.0 | unknown |
| $VLDPE_1$ | VLDPE | LG Chem | LF170 | 0.870 | 1.1 | unknown |
| $VLDPE_2$ | VLDPE | Dow | XUS 61520.15L | 0.870 | 1.0 | unknown |
| $HDPE_1$ | HDPE | Bayport Polymers | 9260 | 0.96 | 2 | 0 |
| $HDPE_2$ | HDPE | LyondellBasell Industries | Alathon M6020 | 0.956 | 2.0 | 0 |
| $HDPE_3$ | HDPE | Nova Chemicals | Sclair 2907 | 0.947 | Unknown | 0 |
| $HDPE_4$ | HDPE | Nova Chemicals | Sclair 19C | 0.947 | Unknown | 0 |
| $MB_1$ | Antiblock Masterbatch | Teknor Color | 10,0758CP Syloid ® Concentrate | unknown | unknown | Unknown |

In addition to the resins identified in Table I, above, polymethylpentene resin can be blended into one or more of the film layers in order to increase the oxygen transmission rate of the film. In an embodiment, TPX RT18 4-methylpentene-1 polyolefin-based resin, having a density of 0.83 g/cc and a melt index of 26 g/10 min, is used. Polymethylpentene resins have a very high oxygen transmission rate (e.g., at least 50,000 cc/m2/day), and also have a very high modulus (about 100,000 psi), and hence may be blended into resins used in one or more of the film layers. In an embodiment, polymethylpentene used in films suitable for use as the top web (i.e., forming web) in skin packaging applications, particularly vacuum skin packaging applications. Such films may have a thickness of at least 2 mils, from 2.5 to 5 mils, or about 3 mils. In an embodiment the films have been irradiated to a level of from 150 to 250 kGy, In another embodiment about 200 kGy. Seafood is a preferred product for vacuum skin packaging in such films.

The following Examples are intended to illustrate the preferred embodiments of the invention and it is not intended to limit the invention thereby. Percentages indicated in the examples are % by weight. While certain representative embodiments and details have been shown for the purpose of illustration, numerous modifications to the formulations described above can be made without departing from the invention disclosed.

Blown films were made using a manufacturing process as illustrated in FIG. 6, described above. After the hot blown film was collapsed and slit into single-wound rolls, it was taken to an off-line electron-beam crosslinking unit. There it received crosslinking treatment of 200 kGy. The film had a total thickness of approximately 3 mils.

Table II provides the layer arrangement, layer composition, and layer thickness for each of Examples 1-8. In is understood that layer 2 may be made as a single layer or as multiple layers having the same composition or as microlayers.

TABLE II

Structure and Composition of Multilayer Films of Examples 1-8

|  | Layer No. 1: Composition *** % of total film thickness | Layer No. 2: Composition *** % of total film thickness | Layer No. 3: Composition *** % of total film thickness |
|---|---|---|---|
| Example No. 1 (Control) | 95% $LDPE_1$ 5% $MB_1$ *** 2.7% | 100% $mPE_1$ *** 94.9% | 95% $HDPE_2$ 5% $MB_1$ *** 2.4% |
| Example No. 2 | 95% $LLDPE_1$ 5% $MB_1$ *** 2.7% | 72.5% $mPE_1$ 27.5% $VLDPE_2$ *** 94.9% | 95% $HDPE_1$ 5% $MB_1$ *** 2.4% |
| Example No. 3 | 95% $LLDPE_2$ 5% $MB_1$ *** 2.7% | 72.5% $mPE_1$ 27.5% $VLDPE_2$ *** 94.9% | 95% $HDPE_1$ 5% $MB_1$ *** 2.4% |
| Example No. 4 | 95% $LLDPE_1$ 5% $MB_1$ *** 2.7% | 70% $mPE_1$ 30% $VLDPE_2$ *** 94.9% | 95% $HDPE_1$ 5% $MB_1$ *** 2.4% |
| Example No. 5 | 95% $LLDPE_1$ 5% $MB_1$ *** 2.7% | 70% $mPE_1$ 30% $VLDPE_2$ *** 94.9% | 95% $HDPE_1$ 5% $MB_1$ *** 2.4% |
| Example No. 6 | 95% $LLDPE_1$ 5% $MB_1$ *** 2.7% | 72.5% $mPE_1$ 27.5% $VLDPE_1$ *** 94.9% | 95% $HDPE_1$ 5% $MB_1$ *** 2.4% |
| Example No. 7 | 95% $LLDPE_1$ 5% $MB_1$ *** 2.7% | 72.5% $mPE_1$ 27.5% $VLDPE_1$ *** 94.9% | 35% $HDPE_3$ 60% $HDPE_4$ 5% $MB_1$ *** 2.4% |
| Example No. 8 | 95% $LLDPE_1$ 5% $MB_1$ *** 2.7% | 72.5% $mPE_1$ 27.5% $VLDPE_2$ *** 94.9% | 95% $HDPE_2$ 5% $MB_1$ *** 2.4% |

Oxygen Transmission Rate Measurements for Films of Examples 1-8

The oxygen transmission rate (i.e., "OTR") for various film samples in accordance with each of Examples 1-8 was analyzed on a Mocon OX-TRAN® measurement device in accordance with ASTM D-3985 (all measurements taken at 73° F., 0% relative humidity, 1 atm pressure) and reported on Table III below.

TABLE III

| Example No. | OTR (cc (STP)/m2/day/1 atm at 23 C. at 0% RH) | Film Gauge (mils) |
|---|---|---|
| 1 (Control) | 12,100 | 3.0 |
| 2 | 10,340 | 3.0 |
| 3 | 13,550 | 3.0 |
| 4 | 10,400 | 3.0 |
| 5 | 11,950 | 2.7 |
| 6 | 11,550 | 3.0 |
| 7 | 9,910 | 3.0 |
| 8 | 11,550 | 3.0 |

TABLE IV

Physical Properties of films 1-8

| Film |  | 1 (Control) | 2 | 3 | 4 | 5 | 6 | 7 | 8 |
|---|---|---|---|---|---|---|---|---|---|
| OTR (cc/m2/day @ 1 atm) |  | 12,100 | 10,340 | 13,550 | 10,400 | 11,950 | 11,550 | 9,910 | 11,550 |
| Tensile Strenght at Break (psi) | Longitudinal | 5610 | 6840 | 6650 | 6570 | 5800 | 6190 | 5950 | 6700 |
| Tensile Strenght at Break (psi) | Transverse | 5850 | 6280 | 6000 | 7050 | 7120 | 5820 | 5990 | 7000 |
| Elongation at Break (%) | Longitudinal | 700 | 670 | 660 | 670 | 660 | 690 | 680 | 680 |
| Elongation at Break (%) | Transverse | 740 | 720 | 710 | 750 | 740 | 750 | 730 | 720 |
| Young's Modulus (psi) | Longitudinal | 4430 | 5230 | 5350 | 5680 | 6500 | 5800 | 6180 | 4930 |
| Young's Modulus (psi) | Transverse | 5000 | 6400 | 7280 | 6150 | 7550 | 6280 | 6580 | 6200 |

TABLE IV-continued

Physical Properties of films 1-8

| Film | | 1 (Control) | 2 | 3 | 4 | 5 | 6 | 7 | 8 |
|---|---|---|---|---|---|---|---|---|---|
| Tear Propagation - Max. Load (g) | Longitudinal | 75.8 | 99.9 | 103 | 102 | 95.6 | 100 | 116 | 102 |
| Tear Propagation - Max. Load (g) | Transverse | 102 | 121 | 121 | 115 | 121 | 118 | 152 | 117 |
| Tear Resistance - Max Load (grams) | Longitudinal | 248 | 330 | 327 | 355 | 312 | 346 | 328 | 365 |
| Tear Resistance - Max Load (grams) | Transverse | 250 | 299 | 276 | 325 | 345 | 347 | 308 | 305 |
| Impact - Peak Force (J) | | | 20.76 | 24.82 | 25.04 | 33.08 | 28.14 | 25.43 | 32.94 | 33.36 |

Table IV above demonstrates films having both good OTR and machinability parameters such as tensile strength, elongation, Young's modulus, tear propagation, tear resistance and impact force.

Although there are a number of polyolefin resins that provide a relatively high oxygen transmission rate, they may not provide a high enough oxygen transmission rate to make a film which meets OTR of at least 10,000 cc (STP)/m2/day/1 atm at 23 C at 0% RH measured according to ASTM 3985. Alternatively, they may provide the required OTR, but may be difficult to process or have poor abuse resistance. For example, although the film could be manufactured with the necessary OTR, they may not have good processability or abuse resistance. Films having poor processability may break during manufacture of fail to provide good cuts during packaging.

This written description uses examples to disclose the invention and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A multilayer film comprising:
   A. a first layer which is a first outer film layer which serves as a heat seal layer, the first layer, the first layer having a thickness of from 1 to 20 percent of a total thickness of the multilayer film;
   B. at least one second layer which serves as a high oxygen transmission layer, the at least one second layer comprising a blend of:
      i. 5 to 35 wt % of a heterogeneous ethylene/alpha-olefin copolymer having a density of at least 0.89 g/cc; and
      ii. 65 to 95 wt % of at least one member selected from the group consisting of:
         a. ethylene acrylate copolymer;
         b. homogeneous ethylene/alpha-olefin copolymer having a density of from 0.86 to 0.91 g/cc;
         c. ethylene acrylic acid;
         d. ethylene/vinyl acetate copolymer having a vinyl acetate monomer content of from 10 to 30 mole percent; and
         e. styrene butadiene block copolymer; and
   the at least one second layer having a thickness of from 60 to 98 percent of the total thickness of the multilayer film; the total thickness of the multilayer film being at least 1.5 mils, and the film having an oxygen transmission rate of at least 8,000 cc (STP)/m2/day/1 atm at 23 C at 0% RH measured according to ASTM 3985.

2. The multilayer film of claim 1 further comprising a third layer which is a second outer film layer which serves as a skin layer, the third layer having a thickness of from 1 to 20 percent of a total thickness of the multilayer film.

3. The multilayer film of claim 1, wherein the multilayer film is not perforated.

4. The multilayer film of claim 1, wherein the first layer comprises a first polymer selected from the group consisting of homogeneous ethylene/alpha-olefin copolymer, heterogeneous ethylene/alpha-olefin copolymer, high density polyethylene, low density polyethylene, linear low density polyethylene, ionomer resin, ethylene/unsaturated ester copolymer and ethylene/unsaturated acid copolymer.

5. The multilayer film of claim 2, wherein the third layer comprises a second polymer selected from the group consisting of homogeneous ethylene/alpha-olefin copolymer, heterogeneous ethylene/alpha-olefin copolymer, high density polyethylene, low density polyethylene, ionomer resin, ethylene/unsaturated ester copolymer and ethylene/unsaturated acid copolymer.

6. The multilayer film of claim 1, wherein the heterogeneous ethylene/alpha-olefin copolymer comprises 10-30 wt % of the second layer.

7. The multilayer film of claim 1, wherein the multilayer film has a tensile strength at break in either the longitudinal or traverse direction of at least 6000 psi as measured in accordance with ASTM D882.

8. The multilayer film of claim 1, wherein the multilayer film has an elongation at break in either the longitudinal or traverse direction of less than 700% as measured in accordance with ASTM D882.

9. The multilayer film of claim 1, wherein the multilayer film has a Young's modulus in either the longitudinal or traverse direction of at least 5000 psi as measured in accordance with ASTM D882.

10. The multilayer film of claim 1, wherein the multilayer film has a tear propagation-max load in the longitudinal direction of at least 80 grams as measured in accordance with ASTM D1938.

11. The multilayer film of claim 2, wherein the at least one second layer makes up from 90 to 95 percent of the total film thickness, with the first and third layers together making up from 5 to 10 percent of the total film thickness.

12. The multilayer film of claim 1, wherein the multilayer film has total film thickness of from 1.5 to 4.0 mils.

13. The multilayer film of claim 1, wherein the multilayer film has a total free shrink at 185° F. of from 50 to 115 percent.

14. The multilayer film of claim 1, wherein at least one layer of the multilayer film comprises a polymer network which has been crosslinked.

15. The multilayer film claim 1, wherein the multilayer film has a total free shrink at 185° F. is less than 10%.

16. The multilayer film of claim 1, wherein the multilayer film has an impact strength peak force of at least 22 Joules as measured in accordance with ASTM D3763.

17. The multilayer film of claim 1, wherein the multilayer film has an oxygen transmission rate of at least 10,000 cc (STP)/m2/day/1 atm at 23 C at 0% RH measured according to ASTM 3985.

18. The multilayer film of claim 1, wherein the ethylene/acrylate copolymer is selected from the group consisting of ethylene/methyl acrylate copolymer, ethylene/ethyl acrylate copolymer and ethylene/butyl acrylate copolymer.

19. A packaged product comprising:
A. a food product;
B. a package surrounding the product, the package comprising a multilayer film comprising:
  i. a first layer which is a first outer film layer which serves as a heat seal layer, the first layer, the first layer having a thickness of from 1 to 20 percent of a total thickness of the multilayer film;
  ii. at least one second layer which serves as a high oxygen transmission layer, the at least one second layer comprising a blend of:
    a. 5 to 35 wt % of a heterogeneous ethylene/alpha-olefin copolymer having a density of at least 0.89; and
    b. 65 to 95 wt % of at least one member selected from the group consisting of:
      1) Ethylene acrylate copolymer;
      2) Homogeneous ethylene/alpha-olefin copolymer having a density of from 0.86 to 0.91 g/cc;
      3) Ethylene acrylic acid;
      4) Ethylene/vinyl acetate copolymer having a vinyl acetate monomer content of from 10 to 30 mole percent; and
      5) styrene butadiene block copolymer; and
the at least one second layer having a thickness of from 60 to 98 percent of the total thickness of the multilayer film; the total thickness of the multilayer film being at least 1.5 mils, and the film having an oxygen transmission rate of at least 8,000 cc (STP)/m2/day/1 atm at 23 C at 0% RH measured according to ASTM 3985.

20. A skin package comprising:
A. a food product;
B. a top web over the product, the top web having a multilayer film comprising:
  i. a first layer which is a first outer film layer which serves as a heat seal layer, the first layer, the first layer having a thickness of from 1 to 20 percent of a total thickness of the multilayer film;
  ii. at least one second layer which serves as a high oxygen transmission layer, the at least one second layer comprising a blend of:
    a. 5 to 35 wt % of a heterogeneous ethylene/alpha-olefin copolymer having a density of at least 0.89; and
    b. 65 to 95 wt % of at least one member selected from the group consisting of:
      1) Ethylene acrylate copolymer;
      2) Homogeneous ethylene/alpha-olefin copolymer having a density of from 0.86 to 0.91 g/cc;
      3) Ethylene acrylic acid;
      4) Ethylene/vinyl acetate copolymer having a vinyl acetate monomer content of from 10 to 30 mole percent; and
      5) styrene butadiene block copolymer; and
the at least one second layer having a thickness of from 60 to 98 percent of the total thickness of the multilayer film; the total thickness of the multilayer film being at least 1.5 mils, and the film having an oxygen transmission rate of at least 8,000 cc (STP)/m2/day/1 atm at 23 C at 0% RH measured according to ASTM 3985; and
C. a substrate to which the multilayer film is adhered.

* * * * *